United States Patent
Higuchi et al.

(10) Patent No.: US 7,369,170 B2
(45) Date of Patent: May 6, 2008

(54) SOLID-STATE IMAGING APPARATUS AND CONTROL METHOD WITH TRANSMISSION CONTROL HOLD CIRCUIT

(75) Inventors: Tsuyoshi Higuchi, Kawasaki (JP); Jun Funakoshi, Kawasaki (JP); Seiji Yamagata, Kawasaki (JP); Toshitaka Mizuguchi, Kawasaki (JP); Katsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 730 days.

(21) Appl. No.: 10/998,587

(22) Filed: Nov. 30, 2004

(65) Prior Publication Data

US 2006/0001749 A1 Jan. 5, 2006

(30) Foreign Application Priority Data

Jul. 2, 2004 (JP) .............................. 2004-197367

(51) Int. Cl.
*H04N 5/335* (2006.01)
*H04N 5/217* (2006.01)
(52) U.S. Cl. ..................................... 348/308; 348/241
(58) Field of Classification Search ................ 348/308, 348/304, 303, 302, 294, 241, 314; 250/208.1; 257/291, 292, 293
See application file for complete search history.

(56) References Cited

U.S. PATENT DOCUMENTS

| 6,635,857 | B1 * | 10/2003 | Kindt ..................... 250/208.1 |
| 6,809,309 | B2 * | 10/2004 | Kwon ..................... 250/214.1 |
| 2003/0112350 | A1 | 6/2003 | Suzuki |
| 2005/0174455 | A1 * | 8/2005 | Elmakias et al. ........... 348/308 |
| 2006/0007334 | A1 * | 1/2006 | Mabuchi ..................... 348/296 |

FOREIGN PATENT DOCUMENTS

| JP | 60-086981 | 5/1985 |
| JP | 2003-143480 A | 5/2003 |
| JP | 2003-169256 | 6/2003 |

* cited by examiner

*Primary Examiner*—Lin Ye
*Assistant Examiner*—Nicholas G Giles
(74) *Attorney, Agent, or Firm*—Arent Fox, LLP.

(57) ABSTRACT

A method for controlling a solid-state imaging apparatus, which includes a plurality of pixels, includes selecting a resetting element of one of the pixels, resetting a detecting unit connected to the pixel, transmitting to a detecting unit, an electric charge accumulated after photoelectric conversion performed by a photoelectric converting element of the pixel, and providing control to set a second end of a transmitting control signal line to an open state.

18 Claims, 10 Drawing Sheets

SOLID-STATE IMAGING APPARATUS AND CONTROL METHOD WITH TRANSMISSION CONTROL HOLD CIRCUIT

CROSS-REFERENCE TO RELATED APPLICATIONS

The present document incorporates by reference the entire contents of Japanese priority document, 2004-197367 filed in Japan on Jul. 2, 2004.

BACKGROUND OF THE INVENTION

1) Field of the Invention

The present invention relates to a solid-state imaging apparatus and a control method of the solid-state imaging apparatus, in which complementary metal-oxide semiconductor (CMOS) image sensor is used.

2) Description of the Related Art

Figure 1:
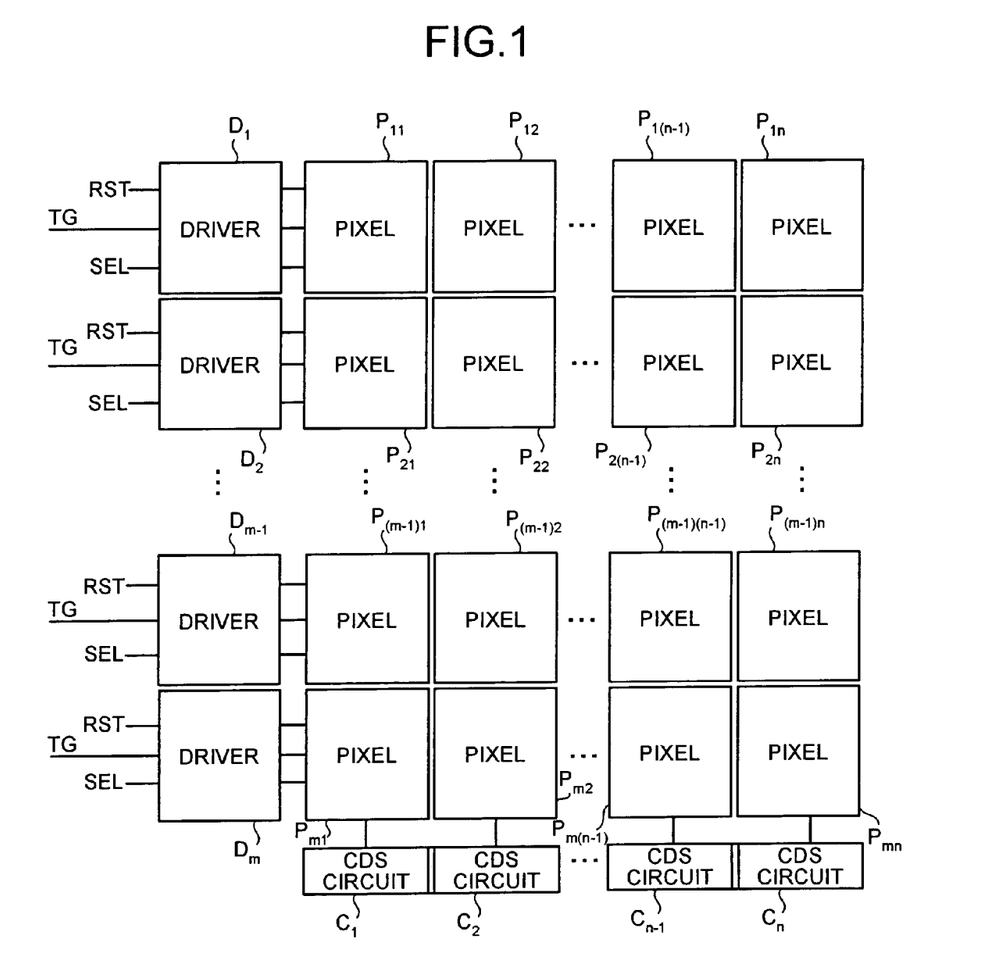
FIG. 1 is a block diagram of pixels and their peripheral parts in a conventional CMOS image sensor.

Solid-state imaging apparatuses using an active pixel sensor (APS) type of CMOS image sensor are well known (see Japanese Patent Laid-Open Publication No. 2003-169256). FIG. 1 is a block diagram of pixels and their peripheral parts in a conventional CMOS image sensor. A plurality of pixels $P_{11}$ through $P_{mn}$ are arranged in a matrix of m rows and n columns. The internal structure of all the pixels $P_{11}$ through $P_{mn}$ is identical. Driver $D_1$ through $D_m$ are connected, one to each row. Correlated double sampling (CDS) circuits $C_1$ through $C_n$ are connected, one to each column.

Figure 2:
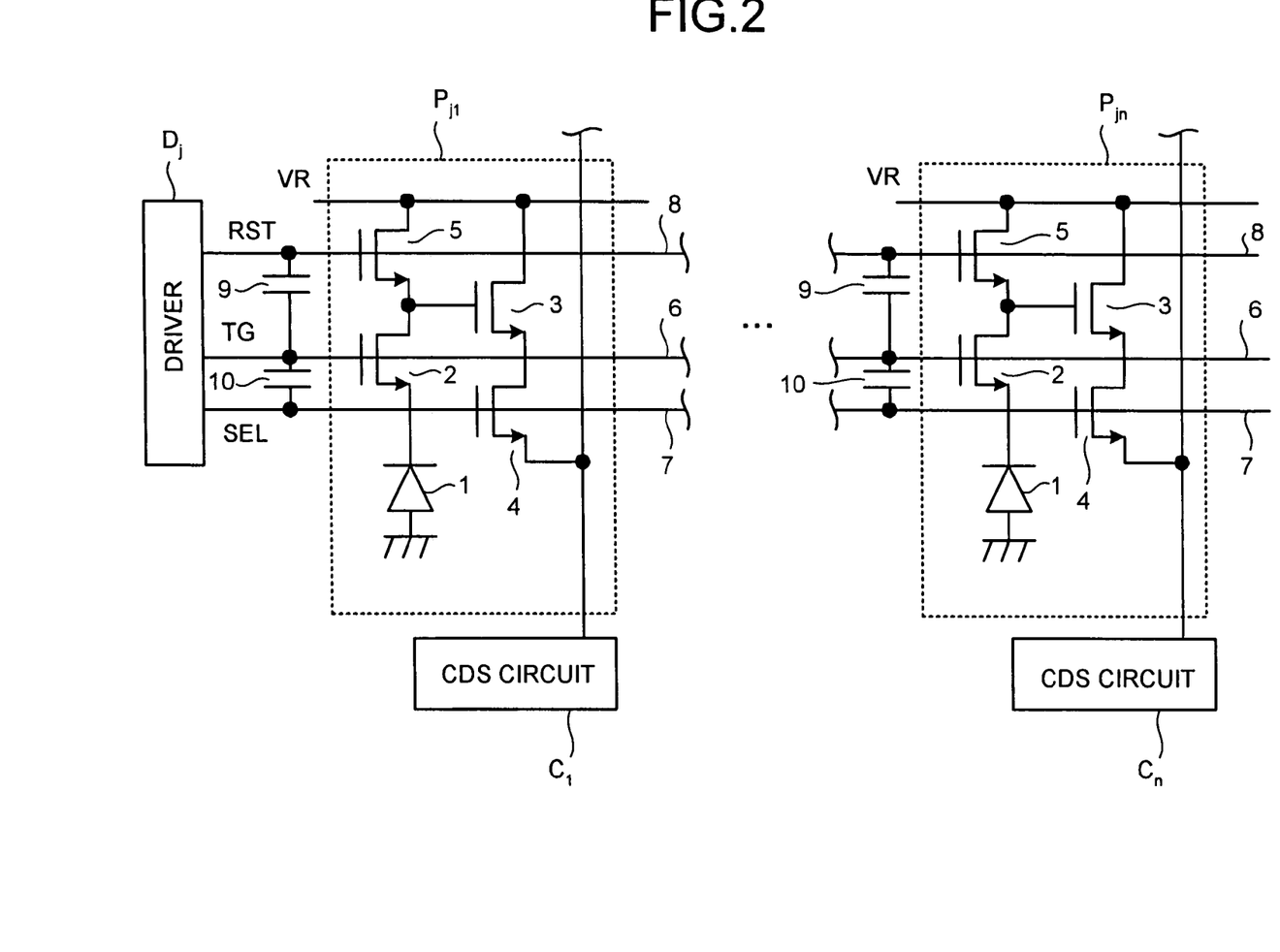
FIG. 2 is an equalization circuit diagram with a magnified view of relevant parts.

FIG. 2 is an equalization circuit diagram showing a magnified view of one row (the j-th row) shown in FIG. 1. Each of the pixels $P_{j1}$ and $P_{jn}$ includes a photodiode 1, a transferring transistor 2, an amplifying transistor 3, a selecting transistor 4, and a resetting transistor 5. In the following explanation, the transmitting transistor 2, the amplifying transistor 3, the selecting transistor 4, and the resetting transistor 5 are assumed to be n-channel MOS transistors.

The transmitting transistor 2, the selecting transistor 4, and the resetting transistor 5 in each of the pixels $P_{j1}$ and $P_{jn}$ belonging to a single row are respectively connected to a common transmission control signal line (hereinafter, "TG signal line") 6, selection control signal line (hereinafter, "SEL signal line") 7, and reset control signal line (hereinafter, "RST signal line") 8. A driver $D_j$ provided for the j-th row drives the TG signal line 6, the SEL signal line 7, and the RST signal line 8. The other rows have the same structure.

Figure 3:
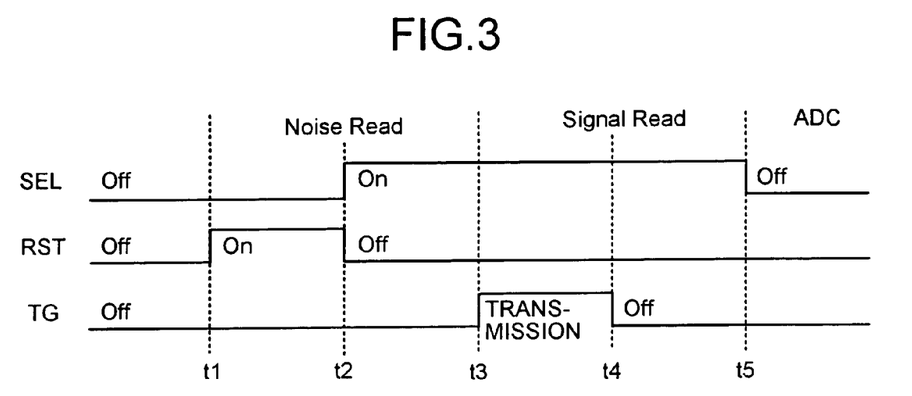
FIG. 3 is a timing chart showing an operation timing during pixel signal reading in the circuit shown in FIG. 2.

FIG. 3 is a timing chart showing an electrical change in the TG signal line 6, the SEL signal line 7, and the RST signal line 8 of the circuit structure shown in FIG. 2 during pixel signal reading. The potentials of the SEL signal line 7, the RST signal line 8, and the TG signal line 6 are low (Off) before time t1. At time t1, the potential of only the RST signal line 8 changes to high (On). At time t2, the potential of the RST signal line 8 changes to low (off) and the potential of the SEL signal line 7 changes to high (On). Next, at time t3 the TG signal line 6 changes to high (transmission). At time t4 the TG signal line 6 changes to low (Off). At t5 the SEL signal line 7 changes to low (off) and the circuit returns to the same state as before time t1.

The duration from t1 to t3 is a period for noise reading (noise read period). In the noise read period the voltage is impressed on the CDS circuits $C_1$ through $C_n$ via the resetting transistor 5, the amplifying transistor 3, and the selecting transistor 4. The CDS circuits $C_1$ through $C_n$ are reset when the voltage is impressed. The duration from t3 to t5 is a period for signal reading (signal read period). In the signal read period, the charge accumulated by the photoelectric conversion of the photodiode 1 is transmitted to the CDS circuits $C_1$ through $C_n$ through the transmitting transistor 2, the amplifying transistor 3, and the selecting transistor 4. The period after t5 is a period in which analog signals are converted to digital signals (Analog/Digital Conversion (ADC) period).

However, in the conventional solid-state imaging apparatus, the RST signal line 8, the SEL signal line 7, and the TG signal line 6 run parallel and in close proximity to one another. Consequently, as shown in FIG. 2, the TG signal line 6 changes to a state of capacitance coupling with the RST signal line 8, due to a parasitic capacitance 9 between the TG signal line 6 and the RST signal line 8. Similarly, the SEL signal line 7 also changes to a state of capacitance coupling with the TG signal line 6, due to a parasitic capacitance 10 between the SEL signal line 7 and the TG signal line 6. Consequently, when the potential in the RST signal line 8 and the SEL signal line 7 changes from low to high in the noise read period, the potential of the TG signal line 6 increases slightly, causing the charge accumulated in the photodiode 1 to leak marginally to the output end of the transmitting transistor 2.

Figure 4:
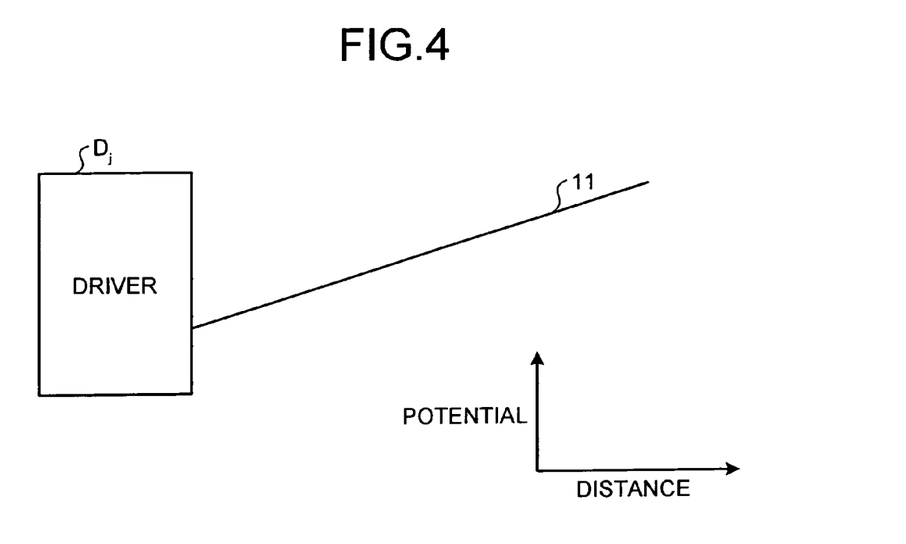
FIG. 4 is a schematic diagram of an electrical change in the TG signal line caused by capacitance coupling in the circuit shown in FIG. 2.

FIG. 4 is a schematic diagram of an electrical change in the TG signal line 6 due to capacitance coupling. The impedance of the TG signal line 6 increases with the distance of the pixel from the driver $D_j$. As represented by reference numeral 11, the potential of the TG signal line 6 increases, thereby increasing the charge leak. Consequently, in the image produced by imaging, portions corresponding to the pixels further from the driver $D_j$ tend to appear darker than the portions corresponding to the pixels closer to the driver $D_j$.

Conventionally, the impedance in the pixels further from the driver Dj in TG signal line 6 does not increase considerably when the number of pixels is around 300,000. Consequently, the amount of electrical change in the TG signal line 6 is also small, and hence, does not pose a problem. However, in recent years, the number of pixels has exceeded 1,000,000, and therefore, a long TG signal line 6 is required. Consequently, in the pixels further from the driver $D_j$, the impedance of the TG signal line 6 increases considerably, thereby increasing the potential in the TG signal line 6. Therefore, the charge leak from the photodiode 1 in the pixels that are further from the driver $D_j$, increases considerably. Thus, there is a large difference in the amount of charge leak in the pixels that are closer to the driver $D_j$ and those that are further from the driver $D_j$, leading to a conspicuous difference in the resulting image.

SUMMARY OF THE INVENTION

It is an object of the present invention to at least solve the problems in the conventional technology.

A solid-state imaging apparatus according to an aspect of the present invention includes a plurality of pixels, each pixel including a photoelectric converting element, a transmitting element connected to a common transmission control signal line, a selecting element connected to a common selection control signal line, and a resetting element connected to a common reset control signal line. After the resetting element of the pixel selected by the selecting element resets a detecting unit connected to the pixel, the transmitting element of the pixel transmits to the detecting unit, an electric charge accumulated after photoelectric conversion performed by the photoelectric converting element of the pixel. A first end of the transmission control signal line is connected to a driving unit, and a second end is connected to a hold circuit. The second end of the transmission control signal line is set at any one of a ground potential and a negative potential at a time from among at least one of a time when the potential of the selection control signal line changes from a potential when the pixel is not selected to a potential when the pixel is selected, and a time when the potential of the reset control signal line changes from a potential when the detecting unit is not reset to a potential when the detecting unit is reset, and the hold circuit provides control to set the second end of the transmission control signal line to an open state, at a time when the driving unit sets the potential of the transmission control signal line to a charge-transmitting potential.

A solid-state imaging apparatus according to another aspect of the present invention includes a plurality of pixels, each pixel including a photoelectric converting element, a transmitting element connected to a common transmission control signal line, a selecting element connected to a common selection control signal line, and a resetting element connected to a common reset control signal line. After the resetting element of the pixel selected by the selecting element resets a detecting unit connected to the pixel, the transmitting element of the pixel transmits to the detecting unit, an electric charge accumulated after photoelectric conversion performed by the photoelectric converting element of the pixel. A first end of the transmission control signal line is connected to a driving unit, and a second end is connected to a hold circuit. The second end of the transmission control signal line is set at a power source potential at a time from among at least one of a time when the potential of the selection control signal line changes from a potential when the pixel is not selected to a potential when the pixel is selected, and a time when the potential of the reset control signal line changes from a potential when the detecting unit is not reset to a potential when the detecting unit is reset, and the hold circuit provides control to set the second end of the transmission control signal line to an open state, at a time when the driving unit sets the potential of the transmission control signal line to a charge-transmitting potential.

A method for controlling a solid-state imaging apparatus, which includes a plurality of pixels, each pixel including a photoelectric converting element, a transmitting element connected to a common transmission control signal line, a selecting element connected to a common selection control signal line, and a resetting element connected to a common reset control signal line, according to still another aspect of the present invention includes selecting a resetting element of the pixel; resetting a detecting unit connected to the pixel, that is performed by the resetting element selected; transmitting to the detecting unit, an electric charge accumulated after photoelectric conversion performed by the photoelectric converting element of the pixel; setting the second end of the transmission control signal line to any one of a ground potential and a negative potential at a time from among at least one of a time when the potential of the selection control signal line changes from a potential when the pixel is not selected to a potential when the pixel is selected, and a time when the potential of the reset control signal line changes from a potential when the detecting unit is not reset to a potential when the detecting unit is reset; and providing control to set the second end of the transmission control signal line to an open state, at a time when the driving unit sets the potential of the transmission control signal line to a charge-transmitting potential.

A method for controlling a solid-state imaging apparatus, which that includes a plurality of pixels, each pixel including a photoelectric converting element, a transmitting element connected to a common transmission control signal line, a selecting element connected to a common selection control signal line, and a resetting element connected to a common reset control signal line, according to still another aspect of the present invention includes selecting a resetting element of the pixel; resetting a detecting unit connected to the pixel, that is performed by the resetting element selected; transmitting to the detecting unit, an electric charge accumulated after photoelectric conversion performed by the photoelectric converting element of the pixel; setting the second end of the transmission control signal line to a power source potential at a time from among at least one of a time when the potential of the selection control signal line changes from a potential when the pixel is not selected to a potential when the pixel is selected, and a time when the potential of the reset control signal line changes from a potential when the detecting unit is not reset to a potential when the detecting unit is reset; and providing control to set the second end of the transmission control signal line to an open state, at a time when the driving unit sets the potential of the transmission control signal line to a charge-transmitting potential.

The other objects, features, and advantages of the present invention are specifically set forth in or will become apparent from the following detailed description of the invention when read in conjunction with the accompanying drawings.

DETAILED DESCRIPTION

Exemplary embodiments of a solid-state imaging apparatus and a control method of the solid-state imaging apparatus according to the present invention are explained next with reference to the accompanying drawings. In the following explanation, m is an integer not less than 1, n is an integer not less than 2, and j is 1 or an integer not greater than m.

Figure 5:
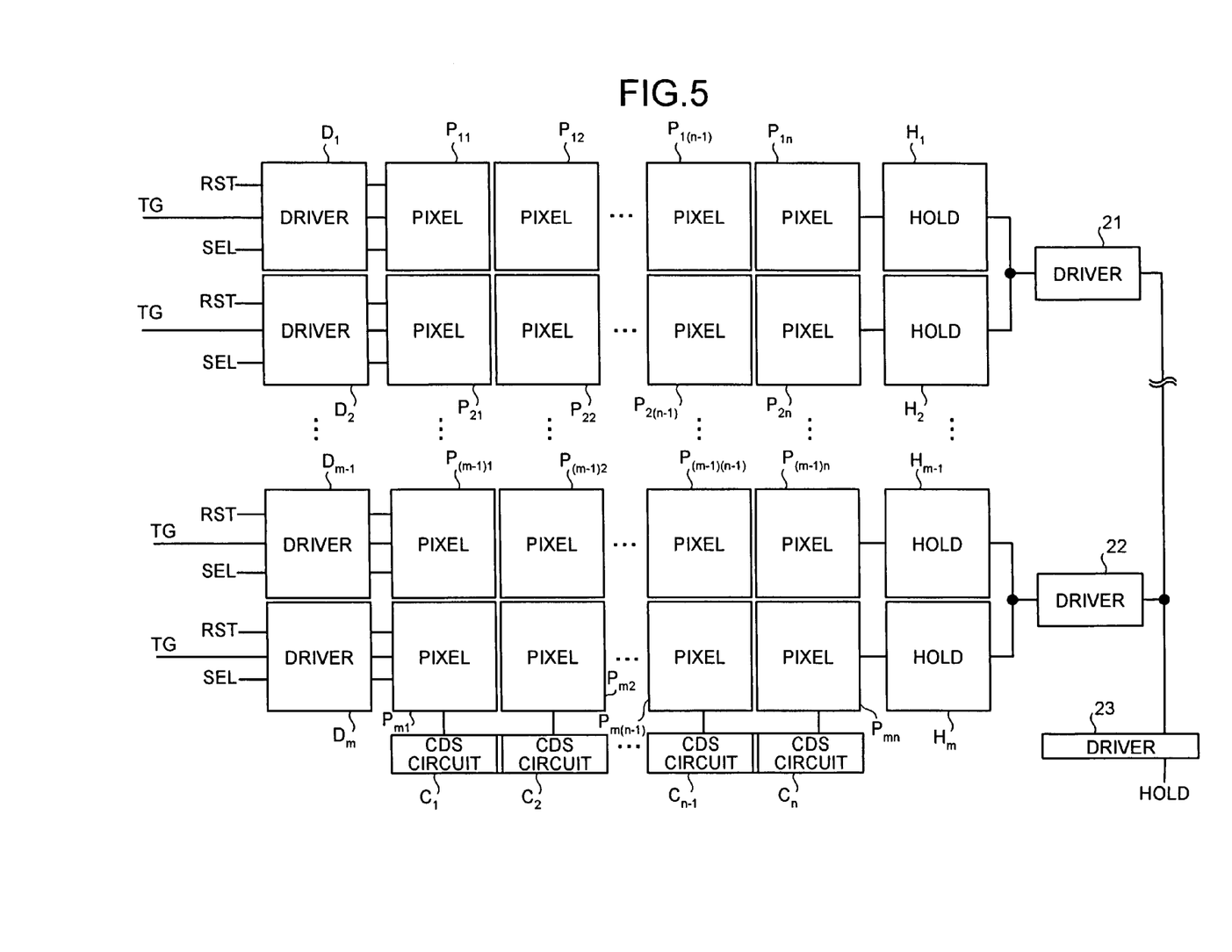
FIG. 5 is a block diagram of pixels and their peripheral parts in a CMOS image sensor according to a first embodiment.

FIG. 5 is a block diagram of the pixels and their peripheral parts in a CMOS image sensor according to a first embodiment. The CMOS image sensor includes a plurality of pixels $P_{11}$ through $P_{mn}$ arranged in a matrix of m row and n columns, and peripheral circuits. The peripheral circuits include drivers $D_1$ through $D_m$, which are m in number, hold circuits $H_1$ through $H_m$, again m in number, drivers 21 and 22 (hereinafter, "primary driver") that drive the hold circuits $H_1$ through $H_m$, a driver 23 (hereinafter, "secondary driver") that drives the primary drivers 21 and 22, and CDS circuits $C_1$ through $C_n$, which are n in number. The drivers $D_1$ through $D_m$ drive each of the pixels $P_{11}$ through $P_{mn}$. The hold circuits $H_1$ through $H_m$ control the status of a TG signal line of each row. The control process is explained in detail later. The CDS circuits $C_1$ through $C_n$ detect the desired signal based on the charge transmitted from the pixels $P_{11}$ through $P_{mn}$.

The drivers $D_1$, $D_2$, $D_{m-1}$, and $D_m$ are provided respectively for the rows (horizontal direction in FIG. 5) $P_{11}$ through $P_{1n}$, $P_{21}$ through $P_{2n}$, $P_{(m-1)1}$ through $P_{(m-1)n}$, and $P_{m1}$ through $P_{mn}$, where each row is formed of n pixels, and are connected respectively to the first pixels of each row $P_{11}$, $P_{21}$, $P_{(m-1)1}$, and $P_{m1}$, which make up the first column. The hold circuits $H_1$, $H_2$, $H_{m-1}$, and $H_m$ are provided respectively for the rows, and are connected respectively to the $n^{th}$ pixels of each row $P_{1n}$, $P_{2n}$, $P_{(m-1)n}$, and $P_{mn}$, which make up the nth column. The CDS circuits $C_1$, $C_2$, $C_{n-1}$, and $C_n$ are provided respectively for the columns (vertical direction in FIG. 5) $P_{11}$ through $P_{m1}$, $P_{12}$ through $P_{m2}$, $P_{1(n-1)}$ through $P_{m(n-1)}$, and $P_{1n}$ through $P_{mn}$, where each column is formed of m pixels.

A few of the m hold circuits $H_1$ through $H_m$ are driven by the primary driver 21, and the others are driven by the primary driver 22. In FIG. 5, the primary driver 21 drives the hold circuits $H_1$ and $H_2$, and the primary driver 22 drives the hold circuits $H_{m-1}$ and $H_m$. The number of hold circuits driven by each of the primary drivers 21 and 22 may also be one or greater than two. Alternatively, a suitable number of primary drivers may be provided to drive all the hold circuits $H_1$ through $H_m$.

A signal that controls each of the hold circuits $H_1$ through $H_m$ (hereinafter, "HOLD signal") is input into the secondary driver 23. The advantage in a structure with the secondary driver 23 controlling the primary drivers 21 and 22 is that the timing of the HOLD signal can be easily obtained. A multilevel structure may also be realized wherein a plurality of primary drivers are divided into groups, each group of primary drivers is driven by a secondary driver, and all the secondary drivers are driven by a tertiary driver.

Figure 6:
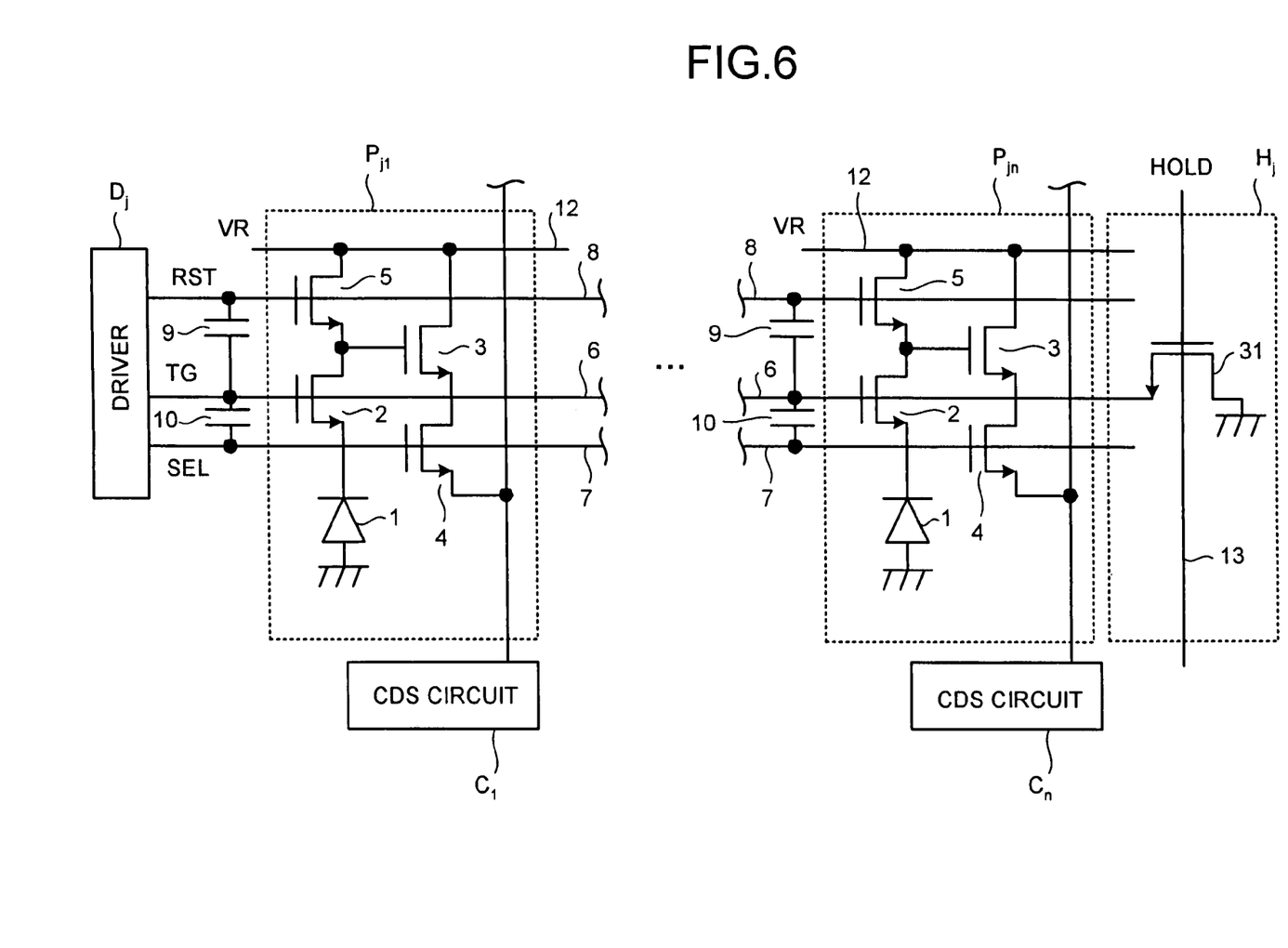
FIG. 6 is an equalization circuit diagram with a magnified view of the relevant parts.

FIG. 6 is an equalization circuit diagram showing a magnified view of one row (the j-th row) shown in FIG. 5. Each of the pixels $P_{j1}$ and $P_{jn}$ includes a photodiode 1. The anode of the photodiode 1 is connected to ground, and the cathode of the photodiode 2 is connected to the source of a transmitting transistor 2. The transmitting transistor 2 is a transmitting element, such as an n-channel MOS transistor.

The gate of the transmitting transistor 2 is connected to the TG signal line 6, and the drain of the transmitting transistor 2 is connected to the source of a resetting transistor 5 and to the gate of an amplifying transistor 3. The resetting transistor 5 is a resetting element, such as an n-channel MOS transistor, and the amplifying transistor 3 may also be an n-channel MOS transistor.

The gate of the resetting transistor 5 is connected to a RST signal line 8, and the drain of the resetting transistor 5 is connected to a power line (VR line) 12. The drain of the amplifying transistor 3 is connected to the power line 12, and the source of the amplifying transistor 3 is connected to the drain of a selecting transistor 4. The selecting transistor 4 is a selecting element, and may be an n-channel MOS transistor. The gate of the selecting transistor 4 is connected to a SEL signal line 7, and the source of the selecting transistor 4 is connected to one of the CDS circuits $C_1$ through $C_n$ corresponding to the column to which the pixel belongs. All the pixels $P_{11}$ through $P_{mn}$ have the same structure.

One each of TG signal line 6, SEL signal line 7, and RST signal line 8 are provided for each row, and run parallel to each other in the direction of the row (horizontal direction in FIG. 6). The pixels $P_{j1}$ and $P_{jn}$ belonging to the same row are all connected to the same TG signal line 6, SEL signal line 7, and RST signal line 8. The TG signal line 6, the SEL signal line 7, and the RST signal line 8 are connected to a driver $D_j$. The TG signal line 6 is connected to a hold circuit $H_j$ at the end opposite to the driver $D_j$.

The hold circuit $H_j$ consists of an n-channel MOS transistor (hereinafter, "hold transistor") 31. The source of the hold transistor 31 is connected to the TG signal line 6 and the drain of the hold transistor 31 is connected to ground. The gate of the hold transistor 31 is connected to a HOLD signal line 13. A HOLD signal is supplied to the hold circuit $H_j$ from the primary drivers 21 and 22 (see FIG. 5) via the HOLD signal line 13.

Figure 7:
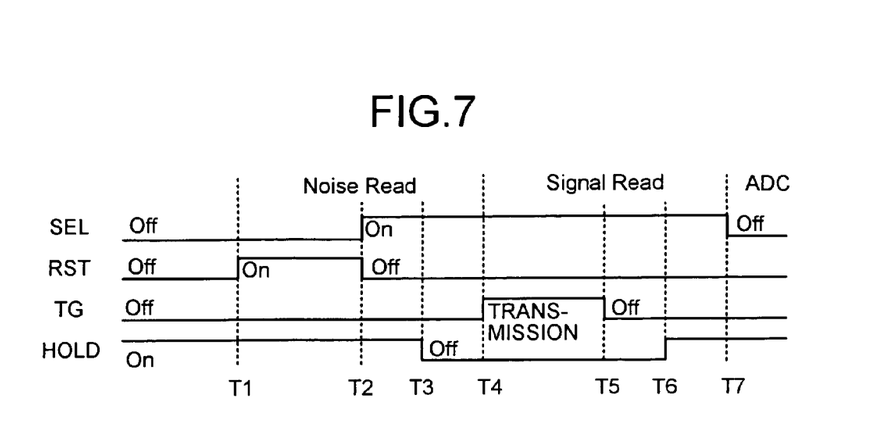
FIG. 7 is a timing chart showing an operation timing during pixel signal reading in a circuit shown in FIG. 6.

FIG. 7 is a timing chart showing an electrical change in the TG signal line 6, the SEL signal line 7, the RST signal line 8 and the HOLD signal line 13 of the circuit shown in FIG. 6, during pixel signal reading. The potentials of the SEL signal line 7, the RST signal line 8, and the TG signal line 6 are low (Off) before time T1, and the potential of the HOLD signal line 13 is high (On). At time T1, the potential of only the RST signal line 8 changes to high (On).

At time T2, the potential of the RST signal line 8 changes to low (Off) and the potential of the SEL signal line 7 changes to high (On). At time T3, the HOLD signal line 13 changes to low (Off). At time T4, the TG signal line 6 changes to high (transmission). At time T5, the TG signal line 6 changes to low (Off). At time T6, the HOLD signal line 13 changes to high (On). At time T7, the SEL signal line 7 changes to low (Off) and the circuit returns to the same state as before time T1.

The time T1 to T4 is a period for noise reading (noise read period). In the noise read period the voltage is impressed on the CDS circuits $C_1$ through $C_n$ via the resetting transistor 5, amplifying transistor 3, and the selecting transistor 4. The CDS circuits $C_1$ through $C_n$ are reset when the voltage is impressed. The potential of the RST signal line 8 is high (On) in the duration from T1 to T2, and the potential of the SEL signal line 7 is high (On) in the duration from T2 to T7.

Consequently, in the duration from T1 to T4, the driver $D_j$ changes the potential of the TG signal line is to low (Off). However, due to capacitance coupling caused by the parasitic capacitance 9 between the TG signal line 6 and the RST signal line 8 (see FIG. 6), and the parasitic capacitance 10 between the SEL signal line 7 and the TG signal line 6 (see FIG. 6), the potential of the TG signal line 6 gradually increases with the distance from the driver $D_j$.

Figure 8:
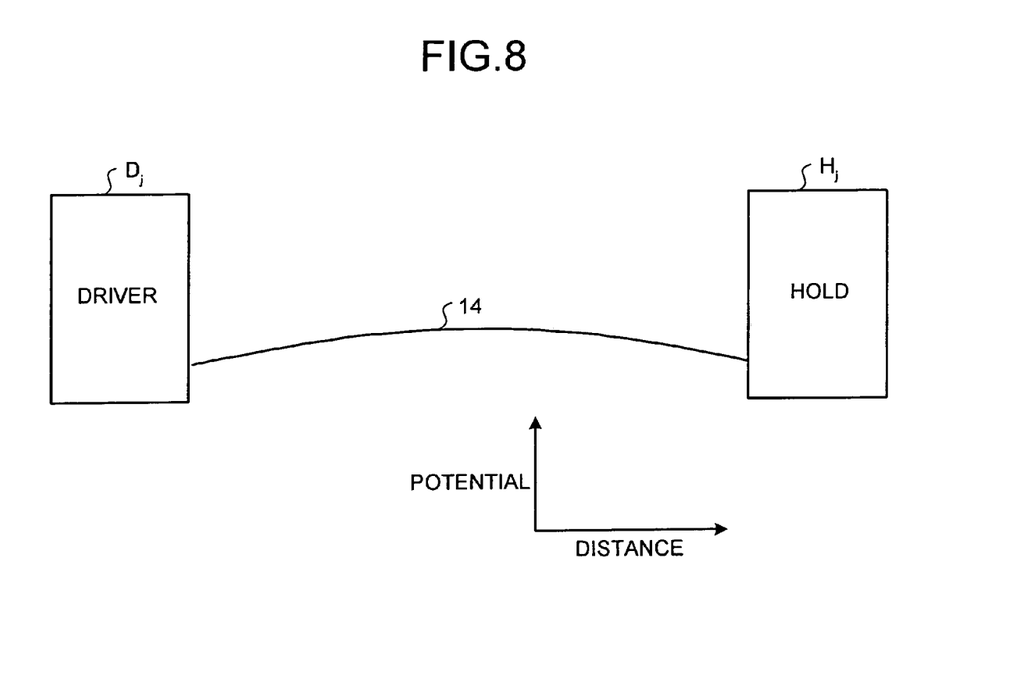
FIG. 8 is a schematic diagram of an electrical change in a TG signal line caused by capacitance coupling in the circuit shown in FIG. 6.

Meanwhile, because the potential of the HOLD signal line 13 is high (On) in the duration from T1 to T3, the hold transistor 31 is in an ON condition, and the potential of the ground node between the TG signal line 6 and the hold transistor 31 is ground potential. In other words, as shown in FIG. 8, which is a schematic diagram of the electrical change in the TG signal line 6, the potential 14 of the TG signal line 6 is ground potential at the driver end as well as the hold end and is marginally high in the middle.

Consequently, the amount of charge leak from the photodiode 1 that occurs during the noise read period reduces as compared to the conventional technology. Further, it is possible to reduce the difference in the charge leak from the photodiode 1 that occurs during the noise read period, in the pixel $P_{j1}$ to the pixel $P_{jn}$ belonging to one row.

The duration from T4 to T7 is a period for signal reading (signal read period). In the signal read period, the charge accumulated by the photoelectric conversion of the photodiode 1 is transmitted to the CDS circuits $C_1$ through $C_n$ through the transmitting transistor 2, the amplifying transistor 3, and the selecting transistor 4. In the duration from T4 to T5, the potential of the TG signal line 6 changes to high (On) and the transmitting transistor 2 is turned ON. Consequently, the potential of the HOLD signal line 13 is maintained at low (Off) with the hold transistor 31 in an OFF condition at least during this period from T4 to T5. In the example shown in FIG. 7, the hold transistor 31 is in an OFF condition not only during the charge transmission period (that is, the duration from T4 to T5) but also both preceding (that is, the duration from T3 to T4) and following (that is, the duration from T5 to T6) the charge transmission period, thereby providing ample margin.

Figure 9:
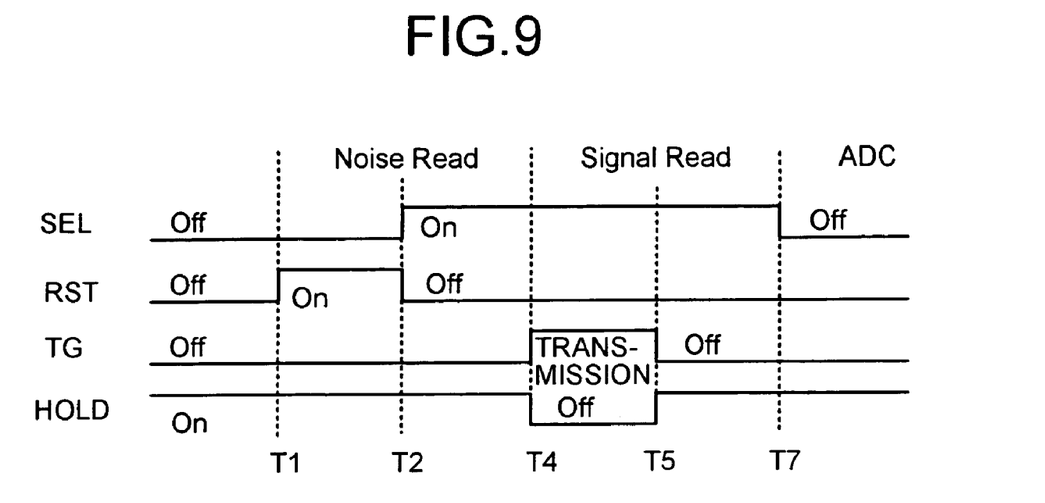
FIG. 9 is a timing chart showing a variation of the operation timing shown in FIG. 7.

As shown in FIG. 9, at time T4, the potential of the TG signal line 6 may be changed to high (transmission) while the potential of the HOLD signal line 13 is changed to low (Off), and at time T5, the potential of the TG signal line 6 may be changed to low (Off) while the potential of the HOLD signal line 13 is changed to high (On). In either case, the period subsequent to time T7 is the ADC period in which analog signals are converted to digital signals.

Figure 10:
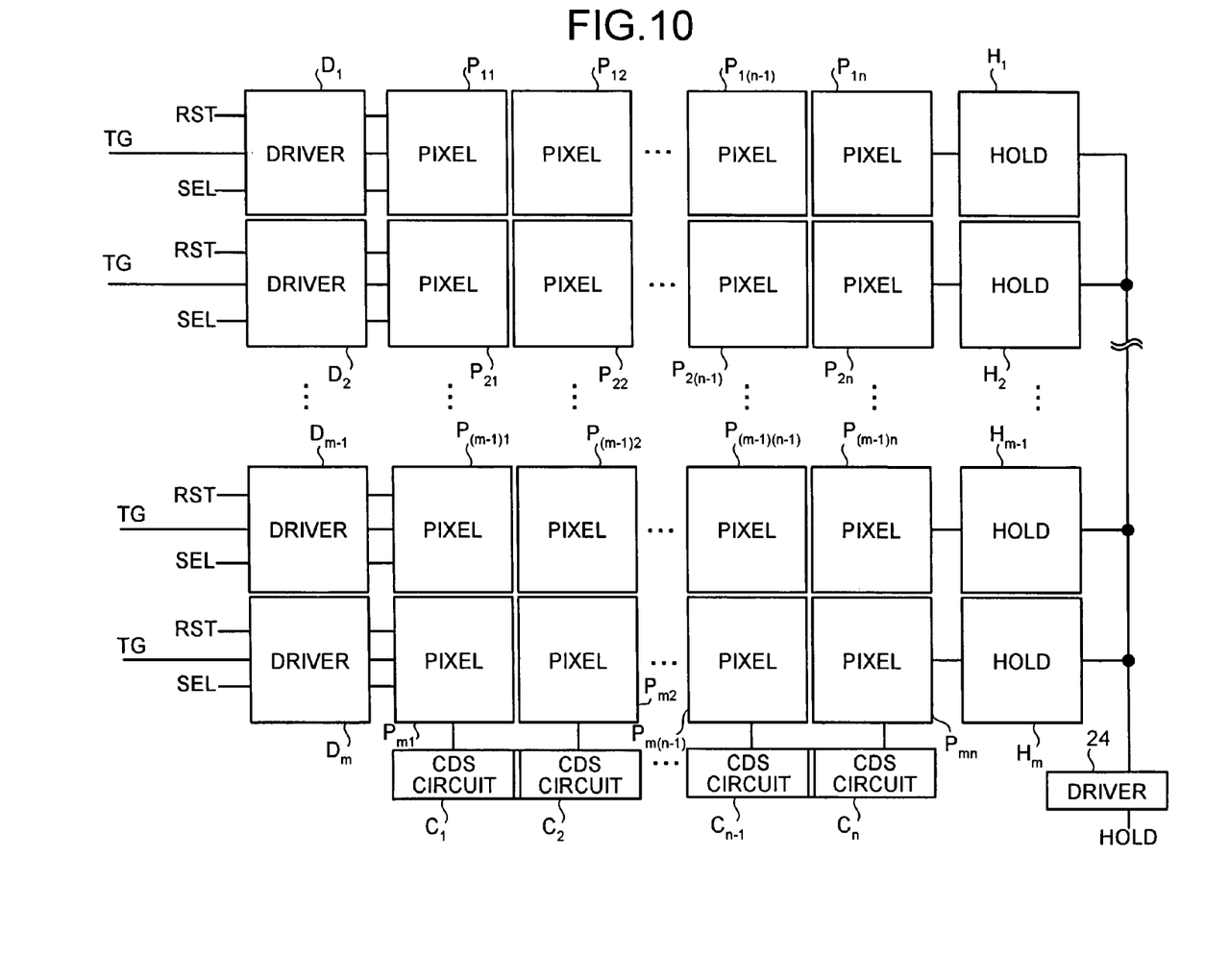
FIG. 10 is a block diagram of pixels and their peripheral parts of a CMOS image sensor according to a second embodiment.

FIG. 10 is a block diagram of the pixels and their peripheral parts of a CMOS image sensor according to a second embodiment. The second embodiment differs from the first embodiment in that a single driver (driving unit) 24 drives all the hold circuits $H_1$ through $H_m$ in the second embodiment.

The rest of the structure and the operation timing are the same as for the first embodiment, and hence, are not described here. According to the second embodiment, the area occupied by the driver that drives the hold circuits $H_1$ through $H_m$ is small, resulting in an overall reduced surface area of the CMOS image sensor.

Figure 11:
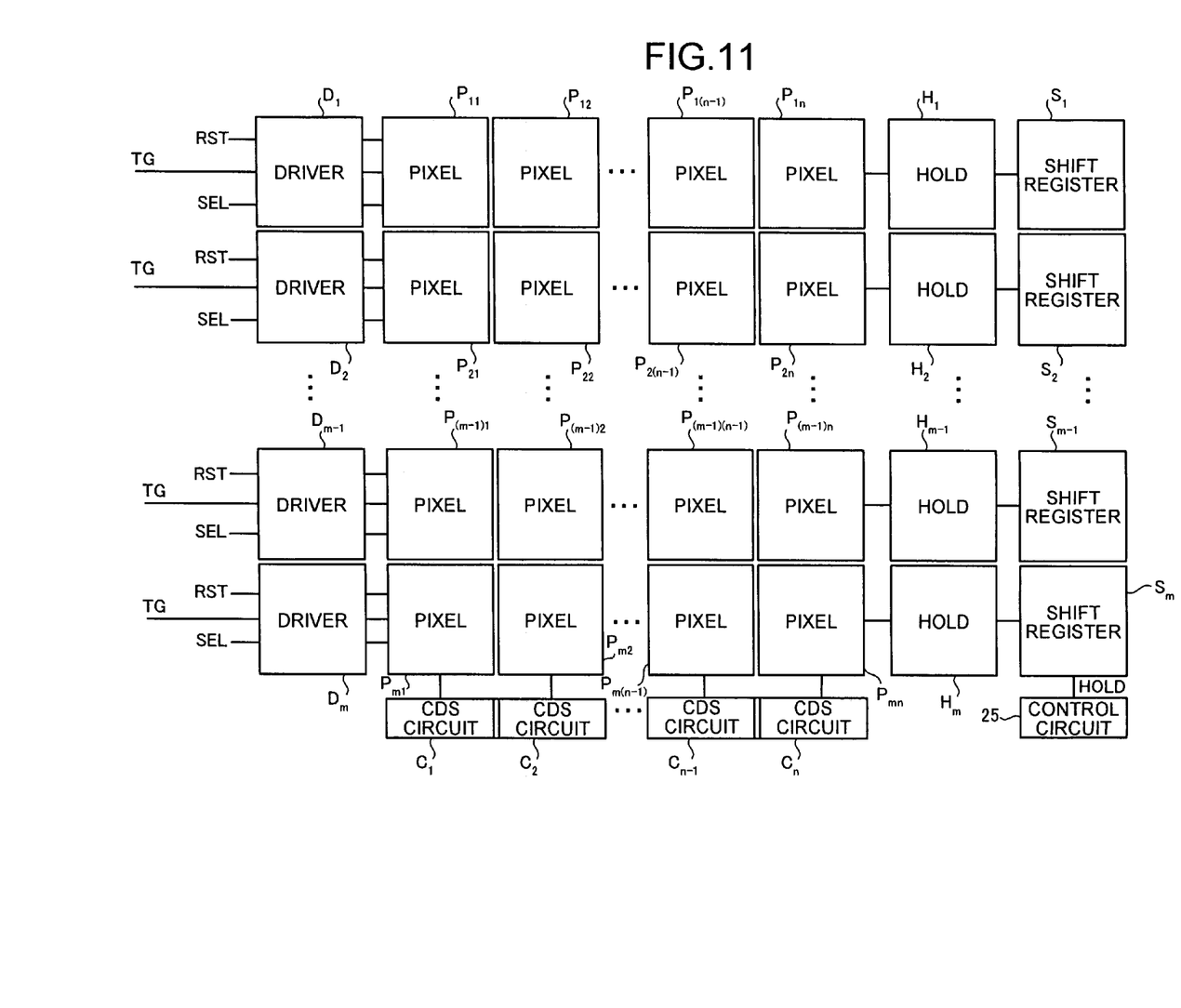
FIG. 11 is a block diagram of pixels and their peripheral parts of a CMOS image sensor according to a third embodiment.

FIG. 11 is a block diagram of the pixels and their peripheral parts of a CMOS image sensor according to a third embodiment of the present invention. The third embodiment differs from the first embodiment in that a control circuit 25 supplies the HOLD signal sequentially to shift registers $S_1$ through $S_m$, and each of the shift registers $S_1$ through $S_m$ in turn supplies the HOLD signal to the respective hold circuits $H_1$ through $H_m$.

The rest of the structure and the operation timing are the same as for the first embodiment, and hence, are not described here. According to the third embodiment, low consumption of electricity is achieved.

Figure 12:
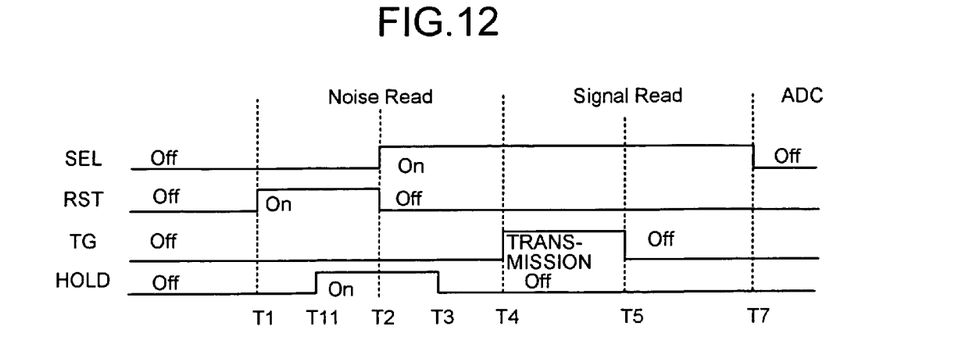
FIG. 12 is a timing chart showing an operation timing according to a fourth embodiment.

FIG. 12 is a timing chart showing an operation timing according to a fourth embodiment of the present invention. The fourth embodiment differs from the first embodiment in that a time T11 is introduced between the time T1 and the time T2, and the potential of the HOLD signal line 13 is set to high (On) only in the duration from T11 to T3, and to low (Off) during the rest of the time.

Because the hold transistor 31 is in an OFF condition when the potential of the RST signal line 8 is changed to high (On), the TG signal line 6 is influenced by the capacitance coupling caused by the parasitic capacitance 9 between the TG signal line 6 and the RST signal line 8. Consequently, this operation timing is suitable when the parasitic capacitance 9 between the TG signal line 6 and the RST signal line 8 is small, and the influence of the capacitance coupling caused by the parasitic capacitance 9 is negligible.

Figure 13:
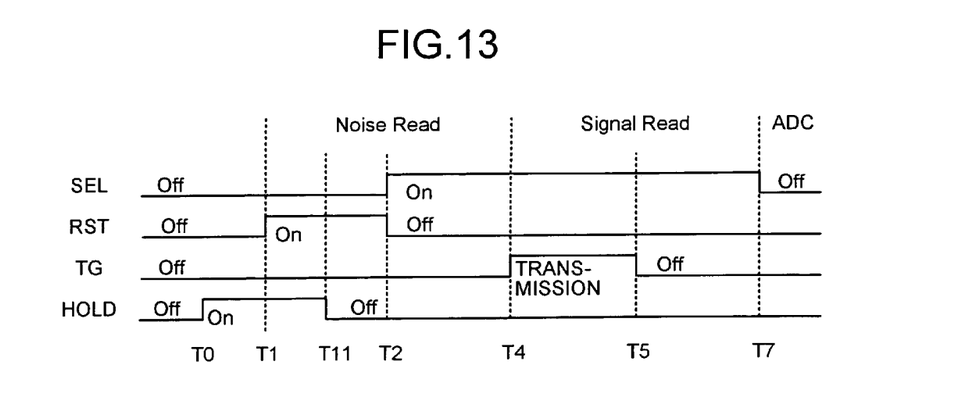
FIG. 13 is a timing chart showing an operation timing according to a fifth embodiment.

FIG. 13 is a timing chart showing the operation timing according to a fifth embodiment of the present invention. The fifth embodiment differs from the first embodiment in that a time T0 is introduced before the time T1, a time T11 is introduced between the time T1 and the time T2, and the potential of the HOLD signal line 13 is set to high (On) only in the duration from T0 to T11, and to low (Off) during the rest of the time.

Because the hold transistor 31 is in an OFF condition when the potential of the SEL signal line 7 is changed to high (On), the TG signal line 6 is influenced by the capacitance coupling caused by the parasitic capacitance 10 between the TG signal line 6 and the SEL signal line 7. Consequently, this operation timing is suitable when the parasitic capacitance 10 between the TG signal line 6 and the SEL signal line 7 is small, and the influence of the capacitance coupling caused by the parasitic capacitance 10 is negligible.

Figure 14:
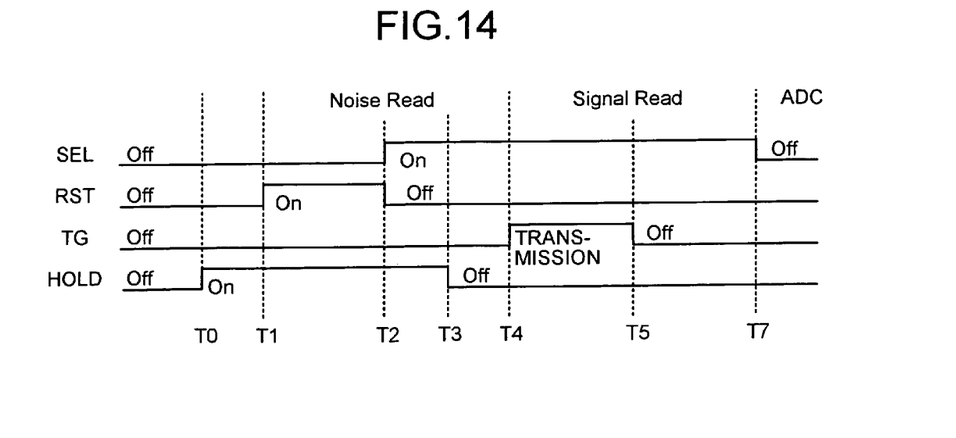
FIG. 14 is a timing chart showing an operation timing according to a sixth embodiment.

FIG. 14 is a timing chart showing the operation timing according to a sixth embodiment of the present invention. The sixth embodiment differs from the first embodiment in that a time T0 is introduced before the time T1, and the potential of the HOLD signal line 13 is set to high (On) only in the duration from T0 to T3, and to low (Off) during the rest of the time.

By doing so, the hold transistor 31 can be kept in an ON condition both when the potential of the RST signal line 8 changes to high (On) and when the potential of the SEL signal line 7 changes to high (On).

The present invention is not limited to the embodiments described herein, and may have variations. For instance, in the embodiments presented here, four rows and four columns of pixels are presented m and n may be any integer m may even be 1 as in the case of line sensors.

Further, the drain potential of the hold transistor 31 may be a negative potential instead of ground potential. As the transistor gets smaller, the current leakage gets greater. Setting the potential of the TG signal line 6 as ground potential cannot suppress the current leakage as effectively as setting a negative potential can. The transmitting transistor 2, the amplifying transistor 3, the selecting transistor 4, the resetting transistor, and the hold transistor 31 may all be p-channel MOS transistors.

According to the present invention, the amount of charge leak from each pixel of a photoelectric converting element reduces. Further, the difference in the amount of charge leak between the pixels of the photoelectric converting element reduces.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A solid-state imaging apparatus comprising:
a plurality of pixels, each pixel including a photoelectric converting element, a transmitting element connected to a common transmission control signal line, a selecting element connected to a common selection control signal line, and a resetting element connected to a common reset control signal line, wherein
after the resetting element of a pixel selected by the selecting element resets a detecting unit connected to the pixel, the transmitting element of the pixel transmits to the detecting unit, an electric charge accumulated after photoelectric conversion performed by the photoelectric converting element of the pixel wherein,
a first end of the transmission control signal line is connected to a driving unit, and a second end is connected to a hold circuit, wherein the second end of the transmission control signal line is set at any one of a ground potential and a negative potential at a time from among at least one of a time when the potential of the selection control signal line changes from a potential when the pixel is not selected to a potential when the pixel is selected, and a time when the potential of the reset control signal line changes from a potential when the detecting unit is not reset to a potential when the detecting unit is reset, and
the hold circuit provides control to set the second end of the transmission control signal line to an open state, at a time when the driving unit sets the potential of the transmission control signal line to a charge-transmitting potential.

2. The solid-state imaging apparatus according to claim 1, further comprising:
a plurality of transmission control signal lines, and
one hold circuit for each transmission control signal line, wherein a control signal supplied by a single driving unit drives all the hold circuits.

3. The solid-state imaging apparatus according to claim 2, wherein
the hold circuit includes a MOS transistor, and
a gate terminal of the MOS transistor receives the control signal.

4. The solid-state imaging apparatus according to claim 1, further comprising:
a plurality of transmission control signal lines, and
one hold circuit for each transmission control signal line, the hold circuits being divided into a plurality of groups, wherein a primary driving unit drives one group, and a control signal supplied by a secondary driving unit drives the primary driving unit.

5. The solid-state imaging apparatus according to claim 4, wherein
the hold circuit includes a MOS transistor, and
a gate terminal of the MOS transistor receives the control signal.

6. The solid-state imaging apparatus according to claim 1, further comprising:
a plurality of transmission control signal lines, and
one hold circuit for each transmission control signal line, wherein each hold circuit is connected to a shift register, and a control signal supplied sequentially by the shift registers drives all the hold circuits.

7. The solid-state imaging apparatus according to claim 6, wherein
the hold circuit includes a MOS transistor, and
a gate terminal of the MOS transistor receives the control signal.

8. A solid-state imaging apparatus comprising:
a plurality of pixels, each pixel including a photoelectric converting element, a transmitting element connected to a common transmission control signal line, a selecting element connected to a common selection control signal line, and a resetting element connected to a common reset control signal line, wherein
after the resetting element of a pixel selected by the selecting element resets a detecting unit connected to the pixel, the transmitting element of the pixel transmits to the detecting unit, an electric charge accumulated after photoelectric conversion performed by the photoelectric converting element of the pixel wherein,
a first end of the transmission control signal line is connected to a driving unit, and a second end is connected to a hold circuit, wherein the second end of the transmission control signal line is set at a power source potential at a time from among at least one of a time when the potential of the selection control signal line changes from a potential when the pixel is not selected to a potential when the pixel is selected, and a time when the potential of the reset control signal line changes from a potential when the detecting unit is not reset to a potential when the detecting unit is reset, and
the hold circuit provides control to set the second end of the transmission control signal line to an open state, at a time when the driving unit sets the potential of the transmission control signal line to a charge-transmitting potential.

9. The solid-state imaging apparatus according to claim 8, further comprising
a plurality of transmission control signal lines, and
one hold circuit for each transmission control signal line, wherein a control signal supplied by a single driving unit drives all the hold circuits.

10. The solid-state imaging apparatus according to claim 9, wherein
the hold circuit includes a MOS transistor, and
a gate terminal of the MOS transistor receives the control signal.

11. The solid-state imaging apparatus according to claim 8, further comprising:
a plurality of transmission control signal lines, and
one hold circuit for each transmission control signal line, the hold circuits being divided into a plurality of groups, wherein a primary driving unit drives one group, and a control signal supplied by a secondary driving unit drives the primary driving unit.

12. The solid-state imaging apparatus according to claim 11, wherein
the hold circuit includes a MOS transistor, and
a gate terminal of the MOS transistor receives the control signal.

13. The solid-state imaging apparatus according to claim 8, further comprising:
a plurality of transmission control signal lines, and
one hold circuit for each transmission control signal line, wherein each hold circuit is connected to a shift register, and a control signal supplied sequentially by the shift registers drives all the hold circuits.

14. The solid-state imaging apparatus according to claim 13, wherein
the hold circuit includes a MOS transistor, and
a gate terminal of the MOS transistor receives the control signal.

15. A method for controlling a solid-state imaging apparatus that includes a plurality of pixels, each pixel including a photoelectric converting element, a transmitting element connected to a common transmission control signal line, a selecting element connected to a common selection control signal line, and a resetting element connected to a common reset control signal line, the method comprising:
  selecting a resetting element of a pixel;
  resetting a detecting unit connected to the pixel, that is performed by the resetting element selected;
  transmitting to the detecting unit, an electric charge accumulated after photoelectric conversion performed by the photoelectric converting element of the pixel;
  setting a second end of the transmission control signal line to any one of a ground potential and a negative potential at a time from among at least one of a time when the potential of the selection control signal line changes from a potential when the pixel is not selected to a potential when the pixel is selected, and a time when the potential of the reset control signal line changes from a potential when the detecting unit is not reset to a potential when the detecting unit is reset; and
  providing control to set the second end of the transmission control signal line to an open state, at a time when the driving unit sets the potential of the transmission control signal line to a charge-transmitting potential.

16. The method according to claim 15, wherein
before changing the potential of the transmission control signal line from a potential when no transmission takes place to a charge-transmitting potential, the potential of the second end of the transmission control signal line is changed from any one of the ground potential and the negative potential to an open state.

17. A method for controlling a solid-state imaging apparatus that includes a plurality of pixels, each pixel including a photoelectric converting element, a transmitting element connected to a common transmission control signal line, a selecting element connected to a common selection control signal line, and a resetting element connected to a common reset control signal line, the method comprising:
  selecting a resetting element of a pixel;
  resetting a detecting unit connected to the pixel, that is performed by the resetting element selected;
  transmitting to the detecting unit, an electric charge accumulated after photoelectric conversion performed by the photoelectric converting element of the pixel;
  setting a second end of the transmission control signal line to a power source potential at a time from among at least one of a time when the potential of the selection control signal line changes from a potential when the pixel is not selected to a potential when the pixel is selected, and a time when the potential of the reset control signal line changes from a potential when the detecting unit is not reset to a potential when the detecting unit is reset; and
  providing control to set the second end of the transmitting control signal line to an open state, at a time when the driving unit sets the potential of the transmission control signal line to a charge-transmitting potential.

18. The method according to claim 17, wherein
before changing the potential of the transmission control signal line from a potential when no transmission takes place to a charge-transmitting potential, the potential of the second end of the transmission control signal line is changed from power source potential to an open state.

* * * * *